Jan. 2, 1951     C. DANNATT     2,536,876
ELECTRIC FOLLOW-UP CONTROL SYSTEM

Filed Aug. 11, 1945     3 Sheets-Sheet 1

Inventor
Cecil Dannatt
By
Pennie, Davis, Marvin Edmonds
Attorneys

Jan. 2, 1951  C. DANNATT  2,536,876
ELECTRIC FOLLOW-UP CONTROL SYSTEM
Filed Aug. 11, 1945  3 Sheets-Sheet 3

Inventor
Cecil Dannatt
By
Pennie, Davis, ...
Attorneys

Patented Jan. 2, 1951

2,536,876

UNITED STATES PATENT OFFICE 2,536,876

ELECTRIC FOLLOW-UP CONTROL SYSTEM

Cecil Dannatt, Hale, England, assignor to Metropolitan-Vickers Electrical Company Limited, London, England, a company of Great Britain, and Vickers-Armstrongs Limited, London, England, a British company Application August 11, 1945, Serial No. 610,353
In Great Britain September 2, 1940

Section 1, Public Law 690, August 8, 1946
Patent expires September 2, 1960

6 Claims. (Cl. 60—53)

This invention relates to follow-up control systems for load devices, for example guns, gun turrets, rudders, fluid valves and other movably mounted objects which are adapted to be moved by suitable motive equipments the torques of which are controlled by means of the follow-up system so that by the manually or otherwise produced movements to predetermined positions of control members such as director gear for example said load devices are caused to follow the movements of and to be set in final positions corresponding to those of said control members.

The invention has for its object to provide an improved follow-up system which is simple and reliable and which in particular will ensure that the load device shall quickly follow the control member and assume, without impermissible "hunting" or self-sustained oscillation, its final position in accurate correspondence with said control member.

Various arrangements and systems have already been proposed to obtain the above results but these prior proposals have suffered from one defect or another so that it has been so far impossible to obtain accuracy corresponding to small fractions of 1° angle. So far as the present applicants are aware none of these prior proposals has succeeded in producing in a reliable and robust apparatus the degree of accuracy required at the present time and which is obtainable with the system according to the invention.

In United States patent application, Serial No. 610,356, filed August 11, 1945, now Patent No. 2,528,486, in the names of Cecil Dannatt and Frederick Harold Belsey, follow-up control systems are disclosed and claimed in which Selsyns devices are coupled with the control member and the load device and are arranged to produce a voltage representative of the displacement of said load device with respect to said control member. A thermionic tube amplifying system is employed for amplifying said voltage, with reactive means interposed between said Selsyns and an output circuit of the thermionic tube amplifying system so as to produce in said circuit a current dependent on the rate of change of said voltage. According to the said application electromagnetic means are connected with said amplifying system so as to be energised by the output of the latter, which means govern the torque imparted to the load device by the motive means therefor, in accordance with the energisation of said electromagnetic means, whereby said torque depends on said voltage and there is added to said torque a component which is dependent on the rate of change of said voltage and therefore of the displacement and which acts in opposition to the velocity of movement of the load device relative to the control member.

The present invention is concerned with a specific form of the follow-up control system outlined above, and has for object to provide a follow-up control system of this type in which the electromagnetic means serve to control a hydraulic transmission system for driving the load device. More specifically it is the object of the invention to arrange that the electromagnetic means controls an adjustable means for varying the velocity ratio in the hydraulic transmission system so that output torque thereof has components depending upon the excitation conditions of the electromagnetic means. Since the excitation of the electromagnetic means will depend upon the relative positional displacement of the control member and load device, and will further depend upon the rate of change of such positional displacement, the output torque from the hydraulic transmission system will have a like dependence. Other advantages and objects of the invention will appear from the description and claims contained herein.

In order that the invention may be clearly understood and readily carried into effect, reference will now be made by way of example to the accompanying drawings in which.

Figure 1:
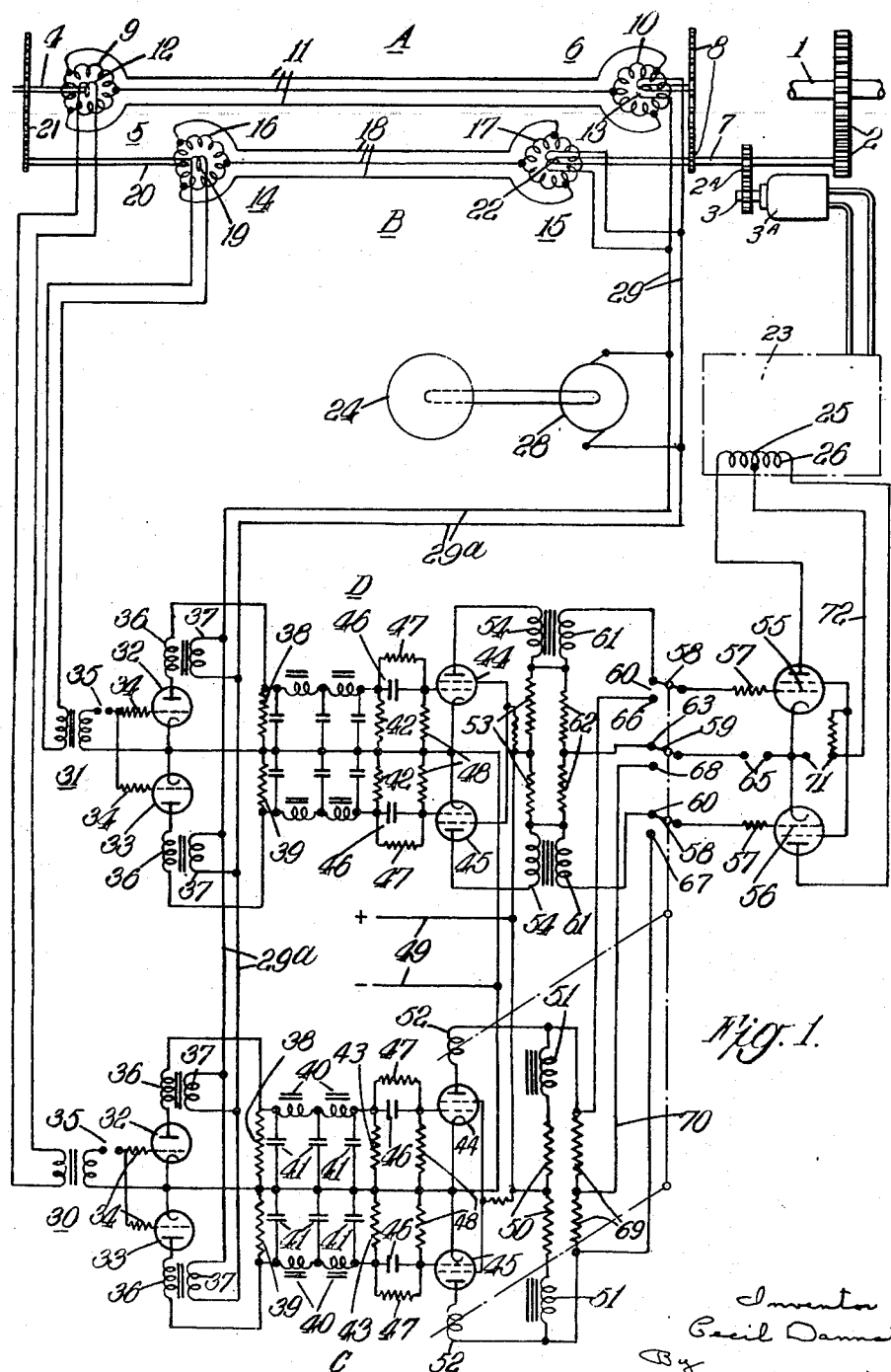
Figure 1 is an electrical diagram of a preferred embodiment of the follow-up control system according to the invention.

In the drawing, the load shaft with which the gun or other load device (not shown) is connected is indicated at 1, this shaft being connected through gearing 2 and 2A, which is preferably fully reversible, with the power output shaft 3 of hydraulic swash plate motor 3A for moving the load device. A control member in the form of a shaft 4 is provided, with which shaft the shaft 1 is required to be maintained in alignment. For example, where the load device comprises a gun the control shaft 4 will be coupled with the director gear. Between the control shaft 4 and the load shaft 1, there are arranged two Selsyn systems A and B which, as will hereinafter be explained, are respectively operative for bringing the shaft 1 into approximate and final alignment with the shaft 4.

The Selsyn system A comprises Selsyn devices 5 and 6 of which the device 5 has its rotor connected with the shaft 4 and the device 6 has its rotor connected with the shaft 7 through gearing 8. The stators of the Selsyn devices 5 and 6 are provided with three-phase windings 9 and 10 interconnected by means of conductors 11. The rotors of said Selsyn devices are provided with single phase windings 12 and 13 connected in a manner to be hereinafter described.

The Selsyn system B comprises Selsyn devices 14 and 15 provided with three-phase stator windings 16 and 17 which are interconnected with one another by means of conductors 18. The rotor of the device 14 is provided with a single phase winding 19 and is connected by means of a shaft 20 and gearing 21 with the control shaft 4 so that said rotor will rotate many times faster than the rotor of the device 5. The rotor of the Selsyn 15 is provided with a single phase winding 22 and is coupled with the motor shaft 7. As will be seen the gearing 8 is such that the rotor of the Selsyn 15 rotates many times faster than that of the Selsyn 6. As will be appreciated two Selsyns 6 and 15 might equivalently be geared directly with the load shaft 1 instead of through the shaft 7 but the arrangement illustrated is preferred in that the effect of backlash in the main gear train 2 in causing lag in response is reduced.

The hydraulic motor 3A forms part of a hydraulic transmission operated under control of control means 23 the nature of which will be apparent from Figs. 2 and 3 to be later described. For the moment it will suffice to indicate that the control means is responsive to movements of a winding having two oppositely wound sections 25 and 26 both located in a magnetic field, so that the torque of the motor 3A will depend upon the resultant excitation of the windings 25 and 26.

A motor 24 is also coupled with a high frequency generator 28, for example producing 1,000 cycles per second, this generator 28 being connected through conductors 29 with the single phase rotor windings 13 and 22 of the Selsyns 6 and 15.

The rotor windings 12 and 19 of the Selsyns 5 and 14 are connected respectively with input transformers 30 and 31 of respective rectifying and amplifying circuit combinations C and D. Each of the rectifying and amplifying combinations C and D comprises a first stage consisting of a pair of hard triodes 32 and 33 the grids of which are connected, through resistors 34, in parallel with one another and so as to be energised from the secondary winding of the input transformer 30 or 31 as the case may be, a suitable source of grid bias voltage being included in the grid circuit as indicated at 35. The anodes of the triodes 32 and 33 are energised from the secondary windings 36 of respective transformers, the primary windings 37 of which are connected by the conductors 29a with the high frequency generator 28. The anode circuits of said triodes include respective resistances 38 and 39 the voltage appearing across which is applied to filter circuits comprising choke coils 40 and condensers 41 and terminal resistances 42 and 43 respectively.

The second stage of each of the rectifying and amplifying combinations C and D comprises a pair of hard multi-grid amplifying tubes 44 and 45 the control grids of which are connected with the terminal resistances 42 and 43 respectively through condensers 46 and resistances 47 in parallel with one another, whilst a further resistance 48 is connected between each of said control grids and the cathodes of the tubes.

The anode circuits of the tubes are supplied from suitable direct current supply conductors 49, the anode circuit of each of the multi-grid tubes in the combination C including a resistance 50 a choke coil 51 and a relay coil 52 all in series with one another. The anode circuit of each of the multi-grid tubes in the combination D includes a resistance 53 and the primary winding 54 of a respective transformer.

The output from the circuit combinations C and D is finally amplified by a further stage comprising a pair of hard tubes 55 and 56, which are preferably of the multi-grid type and as will hereinafter appear, are common to both of said circuit combinations. The control grids of the tubes 55 and 56 are connected through resistances 57 with movable contacts 58 which together with a third movable contact 59 are operated by the relay coils 52, the contacts 58, 59 being illustrated in the position which they occupy when the resultant ampere turns produced by the two coils 52 is less than a predetermined value, the said coils being wound in opposition to one another. In the illustrated position the contacts 58 engage with respective fixed contacts 60 which are connected through the secondary windings 61 associated with the primary windings 54 with the ends of a centre tapped resistance 62, connected across the outer ends of the resistances 53. The midpoint of the resistance 62 is connected with a fixed contact 63 engaged by the movable contact 59 in the illustrated position of the latter. The contact 59 is connected through a suitable source of grid bias voltage at 65 with the cathodes of the tubes 55 and 56.

When the resultant ampere turns of the relay coils 52 rise above the predetermined value hereinbefore referred to, the contacts 58 and 59 are actuated into engagement with alternative fixed contacts comprising contacts 66 and 67 co-operating respectively with the two movable contacts 58 and a fixed contact 68 co-operating with the movable contact 59. The contacts 66 and 67 are connected with the ends of a centre tapped resistance 69 which is connected between the outer ends of the choke coils 51. The contact 68 is connected by means of a conductor 70 with the mid-point of the centre tapped resistance 69.

The relay including the coils 52 is thus operative to connect the grid circuits of the tubes 55 and 56 with the circuit combinations C and D alternatively, according as the difference between the anode currents of the tubes 44 and 45 in the circuit combination C is above or below a predetermined value.

The anode circuits of the tubes 55 and 56 are energised from a suitable direct current supply at 71 the positive side of which is connected by means of a conductor 72 with the centre point of the winding 25, 26 whilst the ends of the latter are connected with the anodes of the tubes 55 and 56 respectively, whereby the flow of anode current in the tube 55 will produce (in a manner to be explained hereinafter) a movement of the load device 1 in one direction and the flow of anode current in the valve 56 will produce movement in the opposite direction.

In the operation of the arrangement above described the alternating current in the rotor windings 13 and 22 of the Selsyns 6 and 15 will produce alternating voltages between the conductors 11 and 18 whereby the stator windings 9 and 16 of the Selsyns 5 and 14 are energised so as to produce a flux which is in alignment with the flux produced by said rotor windings 13 and 22. When, therefore, the rotor winding 12 or 19 is disposed in a position at right angles to the rotor winding 13 or 22 as the case may be, said winding 12 or 19 will have no voltage induced in it but upon departure of either of the rotors of the Selsyns 5 and 14 from these positions, the winding 12 or 19 as the case may be, will have induced in it a voltage which will vary in magnitude according to the sine of the angle of such displacement and which will be either in phase or 180° out of phase with respect to the voltage applied to the rotor windings 13 and 22, according to the direction of said displacement.

Considering first the circuit combination C, the voltage induced in the rotor winding 12 is applied to the grids of both the triodes 32 and 33. The connections of the transformer windings 36 and 37 are such that the anode circuits of these triodes are supplied with voltages which are respectively in phase and 180° out of phase with that supplied to the rotor winding 13, and consequently one or other of said triodes will conduct the greater anode current according as the voltage induced in the rotor winding 12 is in phase or 180° out of phase with the voltage applied to the rotor winding 13. Consequently the difference between the voltages appearing across the resistances 38 and 39 will depend upon the extent of departure of the load shaft 1 from the position of the control shaft 4 and the greater voltage will appear across one or the other of said resistances according to the direction of said displacement.

The voltage appearing across each of the resistances 38 and 39 will be of a pulsating undirectional nature. This pulsating voltage is applied to the terminal resistance 42 and 43 as the case may be after being smoothed by the choke coils 40 and condensers 41. The voltage appearing across each of the resistances 42 and 43 is applied to the control grid of the multi-grid power tube 44 or 45 as the case may be, after the alternating components due to change of said voltage have been advanced in phase due to the combination comprising the condenser 46 and resistances 47 and 48.

Since the anode currents of the tubes 44 and 45 are proportional to the voltages applied to the grids thereof, the difference between said anode currents will be proportional to the displacement. When the displacement is changing, namely, as the load shaft moves into its position of alignment with the control shaft, there will be produced across each choke coil 51 a voltage which is proportional to the rate of change of the anode current of the associated valve 44 or 45. The sum of the voltages appearing across the two coils 51 in series with one another will be proportional to the rate of change of the voltage applied to the triodes 32 and 33, and therefore to the rate of change of the displacement. There is thus applied to the relay contacts 66 and 67 a voltage which contains a component dependent upon the relative velocity of the load with respect to the control shaft in addition to a component, depending upon the displacement, introduced by the voltage appearing across the resistances 59.

It will be seen that the anode current in the tubes 44 and 45 of the circuit combination C depend upon the extent of the misalignment and until the shaft 1 has been brought into approximate alignment with the shaft 4, the relay coils will produce sufficient ampere turns to actuate the moving contacts 58 and 59 to their positions in engagement with the fixed contacts 66, 67 and 68. Consequently, the voltages produced by the circuit combination C are applied to the grids of the tubes 55 and 56. Since the cathodes of these tubes are connected to the mid-point of the resistance 69 the grids will be operated at opposite polarities and consequently the condition of one or the other of said tubes will predominate according as the sum of the displacement and relative velocity components is in one sense or the other. The relative velocity or rate of change of displacement component is arranged to act in such sense as always to oppose the velocity of movement of the load relative to the control shaft whereby oscillation of the latter about the position of alignment or zero displacement is damped.

When the load device has been moved into approximate alignment the anode currents of the tubes 44 and 45 will no longer be sufficient to maintain the relay in its actuated position so that the movable contacts of said relay return to the illustrated position, whereby the grid voltages of the tubes 55 and 56 are placed under the control of the circuit combination D. Under these conditions similar operation to that above described is obtained but instead of the excitation of the coils 25 and 26 being dependent upon the Selsyn system A said excitation is controlled by the Selsyn system B which is more sensitive to small displacements due to the gearing 8 and 21. In the circuit combination D, instead of the voltage corresponding to the relative velocity of the load and control shafts being obtained by a choke coil as in the circuit combination C, said voltage is provided by the secondary winding 61 of the transformers associated with the anode circuits of the valves 44 and 45.

As will be appreciated the inductance of the relay coils 52 may also be employed for differentiating the displacement signal obtained from the Selsyn rotor winding 12, thereby to introduce the relative velocity component, either alone or in conjunction with choke coils such as 51 shown in the drawing.

Preferably the several tubes employed in the circuit combinations C and D and the tubes 55 and 56 are biased to the mid-points of their anode current grid voltage characteristics. In such case both of the triodes 32 and 33 may conduct at the same time as one another. Similarly both of the multi-grid tubes 44 and 45, and also the pentodes 55 and 56, may conduct at the same time as one another. The anode currents in the two tubes 55 and 56 result, as above described, in a tendency to cause the load device 1 to rotate in opposite directions respectively, the net turning effect obtained on the load depending on the algebraic sum of the two anode currents. As will be understood the particular one of the tubes 55 and 56 which conducts the greater current at any time will not necessarily be that corresponding with the tube 44 or 45 which conducts the greater anode current since that one of the tubes 55 and 56 which conducts the greater anode current will be that to which the algebraic sum of the displacement voltage obtained across the resistor 59 or 53 and the relative velocity voltages obtained across the two chokes 51 or the transformer secondary windings 61, as the case may be, is the greater in the positive sense.

Although, as above stated, the several tubes are preferably biased to the mid-point of their characteristics said tubes may alternatively be biased so that in the absence of an initial signal voltage no anode current flows, in which case at any given time the voltage obtained from the Selsyn rotor winding 12 or 19, as the case may be, will cause current to flow in the anode circuit of one only of tubes 32 and 33, and similarly in one only of the tubes 44 and 45.

The several resistances 34 and 57 serve to limit the conduction of the associated tubes when the voltage derived from the Selsyn systems exceed the bias voltages applied to said valves.

Since the regulation of the alternator 28 is necessarily somewhat high at 1,000 cycles per second it may be desirable, in order to prevent possible interaction between the Selsyn systems A and B to provide said alternator with two similar and separate windings, one of which is connected with the rotor winding 13 and with the primary windings 37 of the circuit combination C, and the other of which is connected with the rotor winding 22 and the primary windings 37 of the circuit combination D.

As above described the system introduces into the torque applied to the load a component which depends upon the rate of change of displacement or the relative velocity of the shafts 1 and 4. By this means excessive overshoot and the possibility of maintaining hunting may be substantially completely eliminated, the relative velocity component being made relatively large and sufficient to ensure that any relative movement of the load within the range of proportional response of the tubes is completely deadbeat and any oscillation is thereby suppressed.

When the load is moving into alignment from a large displacement it is required that the movement should be retarded well before the point of alignment or zero displacement is reached in order that the amount of overshooting and the mechanical strain in the gearing and other parts when the motion is arrested shall be reduced. This effect is obtained by arranging that the hard tubes 32, 33 and 44, 55 of the circuit combinations C and D are not saturated until a relatively large angle of displacement exists, for example about 30°, between the two Selsyns 5 and 6 or 14 and 15 as the case may be. For displacements within this range the voltage applied to the grids of the tubes 55 and 56 depends on the combined displacement and relative velocity effects. If the load is moving towards alignment these effects are opposite in sign and the output, that is to say the torque on the load is proportional to the difference of said components. It is arranged that the full output from the tubes 55 and 56 is obtained for a small value of said difference. Consequently if the load is approaching alignment at a given velocity the displacement component would first predominate and full torque would be applied towards alignment. As alignment is aproached the point is reached at which the velocity component exceeds the displacement component. At this point, which occurs earlier according as the velocity of approach to alignment is greater, the transmitted torque is reversed and full retardation applied to the load.

The effectiveness of any follow-up control system depends very largely upon the quickness of response of the torque or the load to changes of the displacement or changes of the rate of change of displacement. Thus, if, for example, the load should oscillate slightly the forces which the control system brings into operation should be directed to suppress this oscillation. If however, there are time lags in the system by which the torque on the load is made responsive to such oscillation there may be some frequency of oscillation of the load at which the correcting force lags so much that instead of opposing a forward swing it reinforces the next backward swing. This action may be cumulative so that self-maintained hunting is built up.

Lag in the control operations above indicated may arise due to the following causes. Thus the smoothing circuit 41, 40 will cause some lag in the alternating components of changing displacement transmitted through said smoothing circuit. With the arrangement described this lag is reduced by the employment of high frequency current for the excitation of the Selsyn systems. As will be appreciated an efficient smoothing circuit cannot be arranged to have a time lag of less than about ten cycles, so that the smoothing circuit would, were the Selsyns operated on a normal fifty-cycle supply, produce a time lag of about 0.2 second. By the use of the high frequency, of one thousand cycles for example, this time lag is reduced to 0.01 second.

A further means by which the lag is reduced is by the employment for the second and final stages of the amplifier arrangement of tubes of the multi-grid type, namely the valves 44, 45, 55 and 56. In these valves the output current from the anodes thereof follow changes in the control grid voltages, provided the latter are small, substantially without lag in spite of inductance in the load circuits of said tubes, due to the very high effective anode circuit resistance of the tubes.

The phase advancing resistance-capacity combination 46, 47 and 48 provides a further means for reducing the lag since, as above described, it advances the phase of alternating components due to change of the displacement, in the output applied to the terminal resistances 42 and 43 of the smoothing circuit. Said resistance-capacity combination may be adjusted to provide overcompensation and will then itself introduce a differentiating effect, which is, however, limited by loss of signal and magnification of the high frequency components which are of course undesired. Furthermore, the introduction of the relative velocity component itself may be regarded as compensating for a proportion of the lag of response, since the reactive voltages appearing across the chokes 31 or the secondary windings 61 lead by one-quarter cycle on the currents through said chokes or the currents in the primary windings 54. Consequently the inclusion of this voltage in the output causes the output to tend to lead the input in time phase.

All the above sources of lag should be considerably over-compensated in order to secure a rapid suppression of the oscillation following any disturbance.

Figure 2:
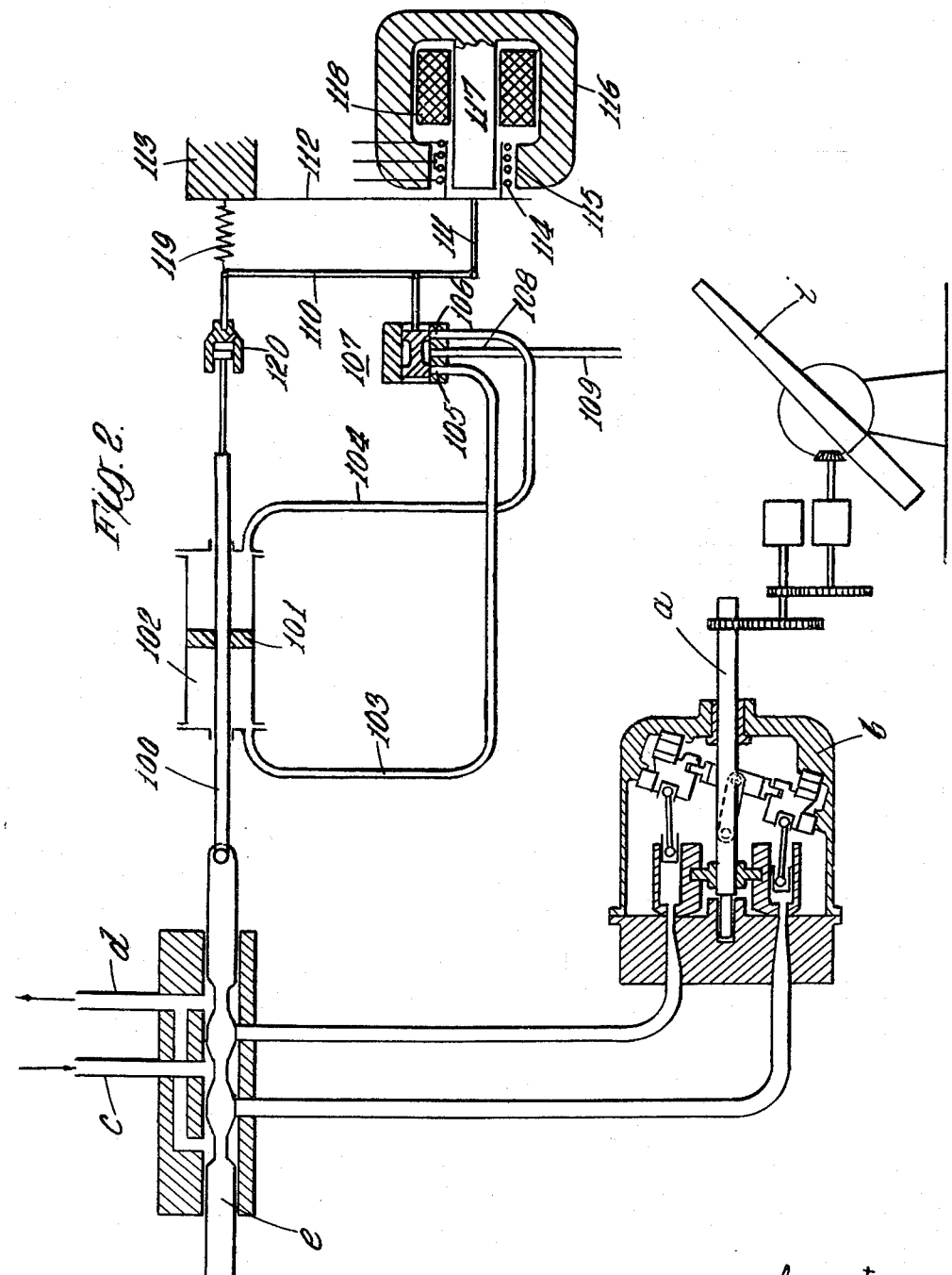
Figures 2 and 3 show alternative details of the follow-up control system according to the invention.
Figure 3:
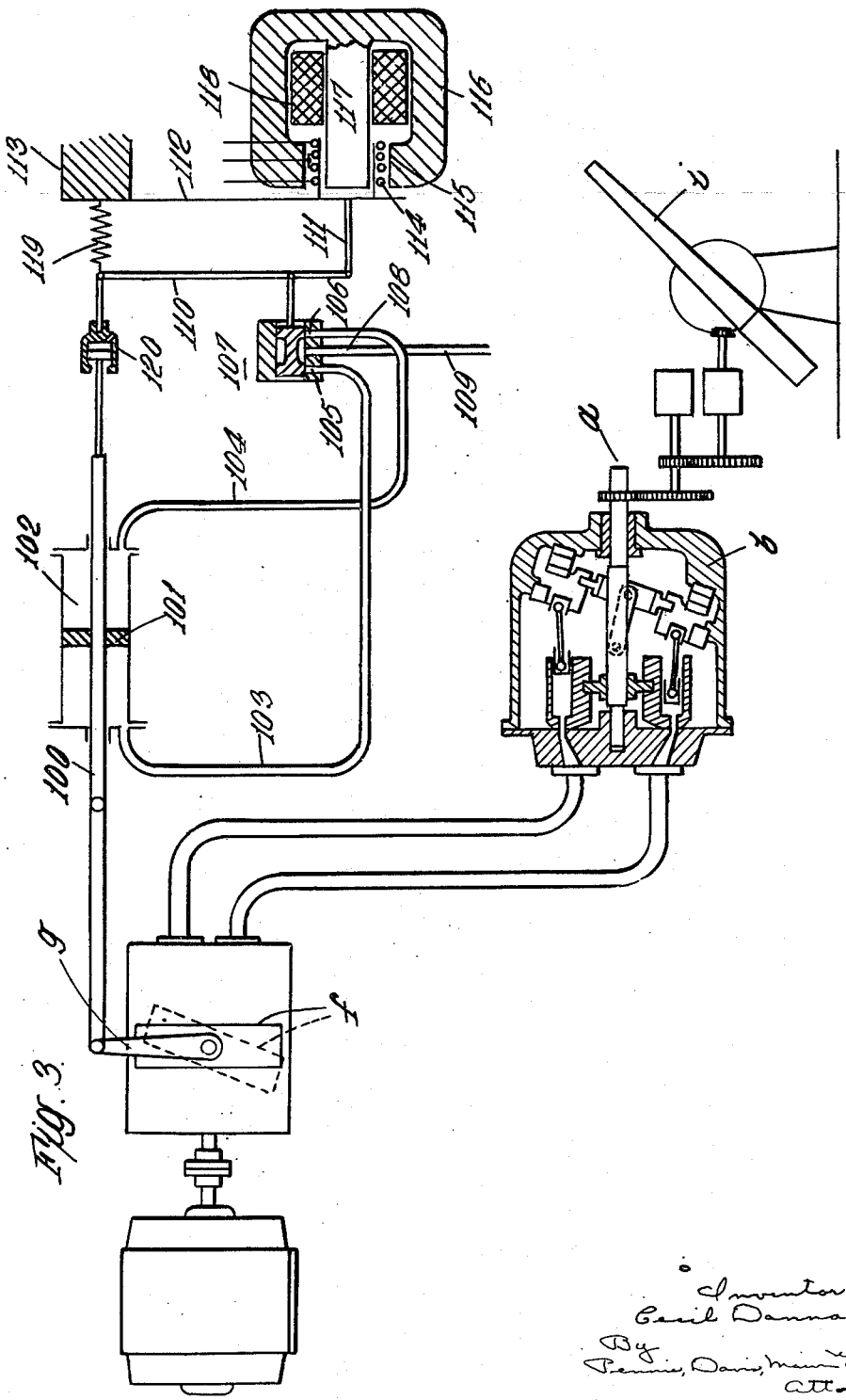

Reference will now be made to Figure 2, which shows the means whereby the follow-up system is employed for adjusting the velocity ratio of a variable velocity ratio transmission through which the load device is driven by the motive equipment. The variable velocity ratio transmission is of the form, known as a "VSG" gear, in which the output shaft $a$ of the transmission is driven by a multi-cylinder hydraulic swash-plate motor $b$ to which fluid pressure is applied by a variable delivery multi-cylinder pump, not shown, but connected to conduits $c$ and $d$, the return conduit $d$ of which can be connected directly to the pump, or to the pump via a tank, or alternatively the conduits c and d can be part of an accumulator system or pressure main, which is driven by the motive equipment, the fluid being circulated directly between the pump and motor and the velocity ratio being adjustable in both magnitude and sense by adjustment of a throttle valve e controlling the flow of fluid between the pump and motor. The position of this throttle valve e determines the velocity ratio of the transmission. In the arrangement of Fig. 2, the control valve e is coupled with a piston rod 100 having mounted thereon a piston 101 which works within a double-acting cylinder 102. In an alternative form of "VSG" gear (see Fig. 3), the velocity ratio is adjustable in both magnitude and sense by adjustment of the angle of inclination of the swashplate f of the pump b to, for example, the position shown in dotted lines. The inclination of this swashplate is determined by a controlling member g of the transmission, which controlling member is coupled mechanically with the piston rod 100 so that with this form of "VSG" gear as well as with that in which the piston rod 100 controls the velocity ratio of the "VSG" gear by a throttle valve e (as in Fig. 2) interposed between the pump and motor of the said gear, the velocity of the load device i will be caused to depend on the position of the piston 101. The two ends of the cylinder are connected by means of respective pipes 103 and 104 with ports 105 and 106 of a piston valve 107 which cooperates also with an inlet port 108 to which fluid under pressure is supplied from a suitable source (not shown) by way of a pipe 109.

The piston valve is connected with an intermediate point of a floating lever 110, the lower end of which is connected by a link 111 with the free end of a cantilever leaf spring 112 which is mounted on a fixed portion 113 of the apparatus.

At its lower end the leaf spring carries a coil 114 which is movable within an annular air gap 115 of a pot magnet 116 having a central limb 117. The pot magnet is excited so as to provide a flux across the annular air gap conveniently by means of an exciting coil 118 which is connected with a suitable source of constant voltage. At its upper end the floating lever 110 is acted upon by a spring 119 which biases said end of the lever to the illustrated central position. The upper end of the lever 110 is also connected with the piston rod 100 through a dash-pot 120.

The coil 114 corresponds to the coil windings 25 and 26 of Figure 1, being in two sections so that the resultant ampere turns produced by the coil 114 will depend upon the difference in conduction of the two tubes 55 and 56 of Fig. 1 and therefore upon the sum of components depending respectively upon the displacement between the load device and the control member and the rate of change of such displacement.

The arrangement is such that with the leaf spring in its unstressed condition the moving coil 114 will be located in the illustrated central position and with the floating lever 110 in the illustrated position the piston valve 107 will cover both of the ports 105 and 106 so that the passage of fluid from the pipe 109 to each side of the piston 101 will be interrupted. When, however, the resultant ampere turns of the section of the coil 114 obtains a positive or negative value the moving coil 114 will be actuated in one direction or the other thereby to uncover either the port 105 or the port 106 and to place said port in communication with the pipe 109 whereby fluid pressure will be applied to the associated side of the piston 101. Assuming, for example, that the moving coil moves to the right in the figure against the action of the leaf spring 112, the pipe 104 will be placed in communication with the pipe 109 to an extent depending on the displacement of the coil. The port 105 will also be uncovered by the piston valve so as to allow exhaust of fluid from the left-hand end of the cylinder 102. The piston 101 will thus be moved to the left and cause adjustment of the velocity imparted to the load device. Balanced conditions will be regained when the piston 101 has reached a position corresponding to a speed of the engine giving a speed of the load device corresponding to that of the control member, after alignment of the load device with the control member has been attained. For any displacement or relative velocity between the driven member and the control device, or for any combination of the two, the ampere turns of the coil 114 will cause displacement of the coil and openings of the piston valve 107, which will operate the piston 101 in such a manner as to cause a change in the setting of the variable velocity ratio transmission to annul the displacement and return the ampere turns of the coil 114 to zero.

In the operation as above described the spring 119 will tend to retain the upper end of the floating lever 110 in the illustrated central position. During movement of the piston 101, however, there will be applied to said upper end of the lever 110 through the dashpot 120 a force which includes a component dependent upon the velocity of the piston 101, increasing as said velocity increases. Since the spring will have a tension substantially proportional to the change in natural length thereof the upper end of the lever 110 will be displaced against the spring 119 by an amount dependent upon said velocity so that an additional displacement will be applied to the piston valve 107 dependent upon the velocity of the piston 101 and tending to cause reclosure of the piston valve when the latter is opened by the pot magnet device. This additional movement imparted to the piston valve will assist in the restoration of balanced conditions throughout the range of movement of the piston 101 in the follow up control system as a whole without oscillation, the arrangement of dashpot and floating lever tending to suppress any tendency for the piston 101 to oscillate about the required position thereof. Thus, the point of connection of the piston valve with the floating lever 110 is chosen such as to cause rapid cut-off of the fluid by the piston valve; that is to say said additional displacement of said valve dependent upon the velocity of the piston 101 will cause said valve to be returned to the illustrated central position before the ampere turns in the coil 114 have been reduced to zero whereby the motion of the piston 101 in approaching a new position providing balanced conditions is checked and said piston will reach the new position without over-shoot or oscillation. The linkage comprising the floating lever 110 and tension spring 119 provides the necessary range of movement of the piston 101 in response to the relatively small movements of the moving coil 114 of the piston valve 107. Preferably the point of connection of the piston valve with the floating lever 110 is adjustable along the length of the latter whereby the operation of the system may be adjusted for the best results.

It will be seen that the moving coil assembly and piston valve serve in conjunction with the servo motor comprising the piston 101 and cylinder 102 as an amplifying means the operation of which depends upon the follow-up control system. The piston rod 100 is connected with the control valve of the "V. S. G." gear so that the latter will be adjusted to increase the speed of the output shaft thereof and thus of the load device when the ampere turns of the coil 114 are increased in the sense corresponding with the displacement between the load device and control member, that is to say, increase of the displacement results in increase of the speed at which the load device will be moved and in calling for changes in speed in this manner the system applies to the load device a corresponding change of torque including the two components dependent respectively on the displacement between the load device and the control member and the rate of change of said displacement. The system will therefore operate so as to apply to the load device a torque which will always adjust itself so as to reduce the resultant ampere turns of the coil 114 to zero and consequently to maintain the load device in alignment with the control member.

Stops operating on the piston rod 100 may be provided for limiting the travel of the piston 101 and thereby limiting the maximum speed of the load device when approaching alignment from a large displacement.

In order to overcome any tendency to sticking or binding of the piston valve 107, a 50 cycle alternating current may be superimposed on the energisation of the moving coil, conveniently by coupling the secondary winding of a transformer to the outer ends of said coil through condensers.

It will be appreciated that the arrangement shown in Figure 2 may be employed with other forms of variable velocity ratio hydraulic transmission and the latter may be of any suitable kind, the output torque of which is in conjunction with the torque speed characteristic of the motive equipment, determinable by the electrically responsive means of the follow-up system, that is to say in Fig. 2 by the moving coil 114 acting through the piston 101, so as to impart to the load device the torque components referred to.

What I claim and desire to secure by Letters Patent of the United States is:

1. A follow-up control system having a control member and a load device, comprising Selsyn devices coupled with the control member and the load device and arranged to produce a voltage representative of the displacement of said load device with respect to said control member, a thermionic tube amplifier system for amplifying said voltage and producing a corresponding output current component, reactive means interposed between said Selsyn devices and an output circuit of said thermionic tube amplifying system so as to produce in said circuit a current dependent on the rate of change of said voltage, an electromagnetic device connected to said output circuit and being thus excited with a first current component proportional to the relative displacement of the control member and the load device, and with a second current component proportional to the rate of change of said relative displacement, a hydraulic motor forming part of a hydraulic transmission system for driving said load device, adjustable means for varying the velocity ratio of said hydraulic transmission system, a connection between said electromagnetic device and said adjustable means so as to obtain an output torque from the hydraulic motor having components depending upon the exciting current components of said electromagnetic means.

2. A follow-up control system having a control member and a load device, comprising Selsyn devices coupled with the control member and the load device and arranged to produce a voltage representative of the displacement of said load device with respect to said control member, a thermionic tube amplifier system for amplifying said voltage and producing a corresponding output current component, reactive means interposed between said Selsyn devices and an output circuit of said thermionic tube amplifying system so as to produce in said circuit a current dependent on the rate of change of said voltage, an electromagnetic device connected to said output circuit and being thus excited with a first current component proportional to the relative displacement of the control member and the load device, and with a second current component proportional to the rate of change of said relative displacement, a hydraulic swash-plate motor for driving said load device, fluid connections to said hydraulic motor, adjustable valve means for controlling the direction and extent of flow of hydraulic fluid to said hydraulic motor, a connection between said electromagnetic device and said adjustable valve means so as to obtain an output torque from the hydraulic motor having components depending upon the exciting current components of said electromagnetic means.

3. A follow-up control system having a control member and a load device, comprising Selsyn devices coupled with the control member and the load device and arranged to produce a voltage representative of the displacement of said load device with respect to said control member, a thermionic tube amplifier system for amplifying said voltage and producing a corresponding output current component, reactive means interposed between said Selsyn devices and an output circuit of said thermionic tube amplifying system so as to produce in said circuit a current dependent on the rate of change of said voltage, an electromagnetic device connected to said output circuit and being thus excited with a first current component proportional to the relative displacement of the control member and the load device, and with a second current component proportional to the rate of change of said relative displacement, a hydraulic swash-plate motor for driving said load device, a hydraulic swash-plate pump for supplying hydraulic fluid to said hydraulic motor, adjustable means for varying the swash-plate angulation and thus the velocity ratio of the hydraulic swash-plate system, a connection between said electro-magnetic device and said adjustable means so as to obtain an output torque from the hydraulic swash-plate motor having components dependent upon the exciting current components of said electromagnetic means.

4. A follow-up control system having a control member and a load device, comprising Selsyn devices coupled with the control member and the load device and arranged to produce a voltage representative of the displacement of said load device with respect to said control member, a thermionic tube amplifier system for amplifying said voltage and producing a corresponding output current component, reactive means interposed between said Selsyn devices and an output circuit of said thermionic tube amplifying system so as to produce in said circuit a current dependent on the rate of change of said voltage, an electromagnetic device connected to said output circuit and being thus excited with a first current component proportional to the relative displacement of the control member and the load device, and with a second current component proportional to the rate of change of said relative displacement, a hydraulic motor forming part of a hydraulic transmission system for driving said load device, adjustable means for varying the velocity ratio at which said hydraulic transmission system operates, a hydraulic servo-motor connected to operate said adjustable means, a valve device for controlling the direction and extent of operation of the servo-motor, a connection between said electromagnetic means and said valve device whereby the valve device is moved in direction and extent according to the components of current in the electromagnetic device to thereby operate the servo-motor and adjust said adjustable means.

5. A follow-up control system having a control member and a load device, comprising Selsyn devices coupled with the control member and the load device and arranged to produce a voltage representative of the displacement of said load device with respect to said control member, a thermionic tube amplifier system for amplifying said voltage and producing a corresponding output current component, reactive means interposed between said Selsyn devices and an output circuit of said thermionic tube amplifying system so as to produce in said circuit a current dependent on the rate of change of said voltage, an electromagnetic device connected to said output circuit and being thus excited with a first current component proportional to the relative displacement of the control member and the load device, and with a second current component proportional to the rate of change of said relative displacement, a hydraulic motor for driving said load device and forming part of a hydraulic transmission system, adjustable means for varying the velocity ratio of the hydraulic system, a hydraulic servo-motor connected with said adjustable means, a valve device controlling said servo-motor both in its direction and extent of operation, an armature associated with said electromagnetic device so as to be displaceable according to the current components therein, a mechanical connection between said armature and one end of a lever, means associated with the other end of said lever to displace the same according to the velocity of operation of said servo-motor, and a mechanical connection between the ends of said lever and said valve device to impart to the latter movements depending upon the current components in said electromagnetic device.

6. A follow-up control system according to claim 1, in which said electromagnetic means comprises a pot magnet having a central limb affording an annular air gap, and a moving coil located in said air gap and connected to receive the output currents from said thermionic tube system.

CECIL DANNATT.

REFERENCES CITED

The following references are of record in the file of this patent:

UNITED STATES PATENTS

| Number | Name | Date |
|---|---|---|
| 2,189,823 | Vickers et al. | Feb. 13, 1940 |
| 2,191,792 | Hill | Feb. 27, 1940 |
| 2,376,359 | Hultin | May 22, 1945 |
| 2,384,962 | Pohl | Sept. 18, 1945 |
| 2,408,070 | Hull et al. | Sept. 24, 1946 |
| 2,412,027 | Alexanderson | Dec. 3, 1946 |